United States Patent [19]

Heiser et al.

[11] 4,086,395
[45] Apr. 25, 1978

[54] MULTI-SLIT SELF-SEALING IGNITION-ARRESTER BATTERY VENT

[75] Inventors: Joseph Irvin Heiser, Wyomissing Hills; Edgar Martin Erb, Lancaster, both of Pa.

[73] Assignee: General Battery Corporation, Reading, Pa.

[21] Appl. No.: 744,647

[22] Filed: Nov. 24, 1976

Related U.S. Application Data

[63] Continuation-in-part of Ser. No. 593,546, Jul. 7, 1975, abandoned.

[51] Int. Cl.$^2$ ............................................. H01M 2/12
[52] U.S. Cl. ......................................... 429/88; 429/89
[58] Field of Search ............................... 429/82, 88, 89

[56] References Cited
U.S. PATENT DOCUMENTS

| | | | |
|---|---|---|---|
| 3,992,226 | 11/1976 | Godshalk | 429/89 |
| 4,010,044 | 3/1977 | Schaumburg | 429/82 |

*Primary Examiner*—Donald L. Walton
*Attorney, Agent, or Firm*—Benasutti Associates, Ltd.

[57] ABSTRACT

A vented battery cap is provided which is adapted to engage at least one of a plurality of fill holes in an automotive storage battery or similar lead acid battery and which has pressure release means for venting the combustible gases produced within that storage battery under conditions such as overcharge conditions into the atmosphere, said pressure release means comprising a plurality of extremely narrow slits having widths in the order of 0.003 to 0.005 of an inch. The remainder of the battery cap is tightly sealed to prevent any extraneous leaks of battery gases received from the automotive battery from leaking into the atmosphere. The slits are so constructed to facilitate the safe expulsion of any volume of gas normally produced by an automotive storage battery, while virtually eliminating the likelihood that ignition of gases within the atmosphere will result in explosive consequences either within the battery cap or within the battery itself.

5 Claims, 11 Drawing Figures

MULTI-SLIT SELF-SEALING IGNITION-ARRESTER BATTERY VENT

CROSS-REFERENCE TO RELATED APPLICATIONS

The present application is a continuation-in-part of my prior co-pending patent application Ser. No. 593,546, filed July 7, 1975, now abandoned entitled "Ignition Arrester Gang Vent", which patent application is incorporated by reference as if fully set forth herein.

BACKGROUND OF THE INVENTION

The present invention generally relates to the field of vented battery caps, and more particularly, to the field of multiple plug vented battery caps which are designed to arrest the ignition and/or to minimize the explosive potential of battery gases upon their expulsion into the atmosphere. It is well known that a suitable battery vent plug must provide for the expulsion of gases which are built up during the chemical charging and discharging action of the battery, while effectively preventing the leakage or evaporation of substantial quantities of battery electrolyte. To this end, battery vent plugs are normally designed with gaseous connection means for venting the gases produced within the battery to the atmosphere, while providing electrolyte retention means within the battery vent plug for retaining and returning as much of the electrolyte to the battery as is practically feasible. This retention of battery electrolyte is normally accomplished through the use of various baffles and/or gabled floors of the battery vent plug which tend to funnel the battery electrolyte which escapes into the battery vent plug back into the battery cells.

Originally, few provisions were made apart from those described above in order to minimize the chance that a spark in the vicinity of the battery would ignite the battery gases, thereby resulting in the possible explosion of the battery vent plug away from the battery container and/or the explosion of the battery itself. More recently, attention has been focused upon the desirability of minimizing the chance that a spark in the vicinity of an operating battery would indeed ignite those gases upon their expulsion to the atmosphere and, alternatively, have attempted to insure that the inadvertent ignition of those gases would not have explosive results. One approach to solving this problem has been to provide a multiple battery vent plug in which gaseous communication was provided from the center of each plug through the body of the plug to four rectangularly widely spaced apart pin hole-like gas outlets disposed on the top cover of the battery for venting these explosive battery gases to the atmosphere, presumably in a diffuse manner. Alternatively, in single battery vent plugs, the interior of the plug which is directly in communication with the battery cell communicates with a gaseous passage disposed under the top surface of the plug by a slot, having a longitudinal member disposed therein, presumably to prevent battery electrolyte from entering the gaseous passage. Two pin hole-like openings are spaced apart on the upper surface of the rather broad cap, again for the purpose of diffusing the explosive battery gases into the atmosphere.

Other designs for venting battery gases safely into the atmosphere have tended to replace pin hole-like openings with larger cylindrical or rectangular openings in which or next to which is disposed a porous ceramic diffuser. These ceramic diffusers are particularly adapted for use in multiple battery vent plugs having a hollow body which is adapted for the mounting of such a porous diffuser in a position intermediate between two adjacent battery plugs. One such porous diffuser for a single battery vent plug is disclosed in French Pat. No. 839,808 (1939). Alternatively, another type of microporous membrane is disclosed in U.S. Pat. No. 3,507,708. U.S. Pat. No. 3,879,227 discloses such a porous diffuser disposed within a multiple battery vent plug. As with most battery vent plugs, the battery vent plugs described in the above mentioned patents are normally provided with sloping surfaces and/or baffles to prevent or inhibit battery electrolyte from contacting the porous diffuser and/or other vent means.

In particular, in addition to having a porous diffuser located adjacent to the atmosphere, U.S. Pat. No. 3,879,227 discloses a compartment disposed between the porous diffuser and the atmosphere, which compartment has an elongated outlet opening to the atmosphere, the ratio of the volume in cubic inches of the compartment to the area of the elongated outlet in square inches being within a particular range. Presumably, this configuration minimizes the effect of explosions which occur in the area immediately adjacent to the porous diffuser, and the size of the compartment and cross sectional area of the elongated opening are so selected as to prevent explosions occurring within the compartment from having serious consequences. To this end, the exterior surface of the compartment is so constructed so that upon the ignition of gases within the compartment the elongated opening has a tendency to increase in cross sectional area, thereby venting the ignited gases directly into the atmosphere. Other patents which generally show multiple battery vent plugs include U.S. Pat. Nos. 3,284,244, 3,265,538, 3,369,940 and 3,597,280. Other battery vent patents include U.S. Pat. Nos. 3,466,199, 2,670,396 and the references cited thereon.

SUMMARY OF THE INVENTION

The present invention relates to a novel battery vent plug having pressure release means comprising a plurality of slits which are extremely narrow by conventional battery venting standards. In particular, applicants have found that when a plurality of appropriately placed extremely narrow slits are disposed extending between the cavity of a vent cap and the atmosphere, the ignition of combustible battery gases in the atmosphere will not travel back through those slits to cause an explosion within the interior of the battery cap or battery. The novel battery cap of the present invention further provides means whereby the ignition of combustible battery gases in the vicinity of a particular slit will frequently result in the self-closure of that slit and the self-extinguishment of the flame which is fed by gases emanating from that slit. Finally, the present invention establishes particular parameters whereby minimum gas resistances are established per cell by said battery cap, as a means insuring that the battery caps of the present invention are constructed to perform in accordance with the preferred embodiments of the present invention.

Accordingly, it is the primary object of the present invention to provide an anti-explosion battery venting means.

Another object of the present invention is to provide a battery vent which will self-extinguish battery gases diffused therefrom which are ignited in the atmosphere adjacent that battery vent, while retaining operational capacities.

A further object of the present invention is the provision of a battery vent comprising a plurality of narrow slits, the width of which slits falls within particular critical dimensions of width.

Another aim of the present invention is to provide a battery vent which diffuses combustible battery gases into the atmosphere in a manner which minimizes contagious combustion of all of the battery gases which are being expelled by given vent cap or vent caps. These and other objects of the present invention will become apparent from the following more detailed description of the invention.

DETAILED DESCRIPTION OF THE DRAWINGS

Figure 1:
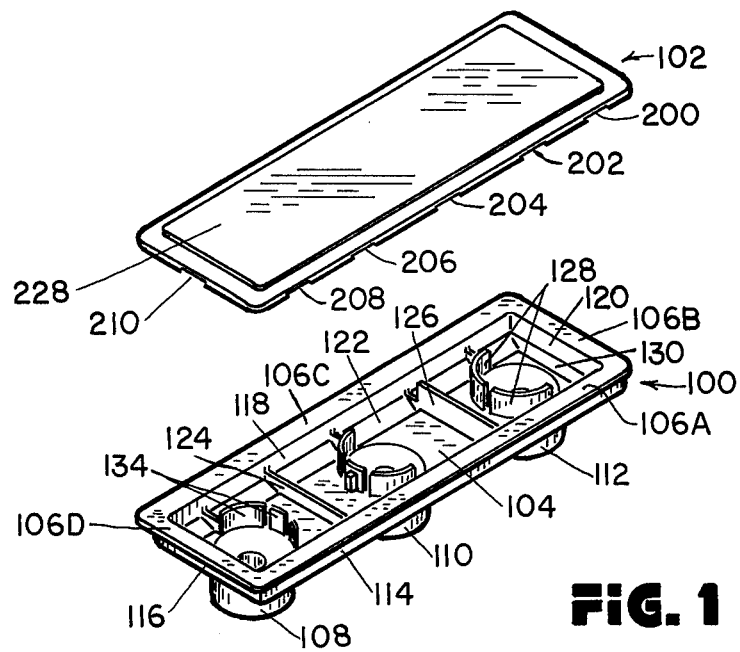
FIG. 1 is an exploded view of a preferred embodiment of the present invention showing the top of that embodiment exploded away from the base thereof.

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1, the preferred embodiment vent cap of the present invention is illustrated as a battery gang vent which is adapted to engage three holes of a conventional automotive storage battery. The battery vent cap of the present invention, as illustrated in FIG. 1, basically comprises a base 100 and a cover 102. As illustrated in FIG. 1, the cover 102 is exploded away from the base 100 for purposes of illustration. In the assembled form, the cover is firmly sealed to or otherwise tightly attached to the cover except at the slit portions as will be described more fully hereinafter, to produce an assembled vent cap as is illustrated in FIGS. 7, 9, 10 and 11.

Figure 2:
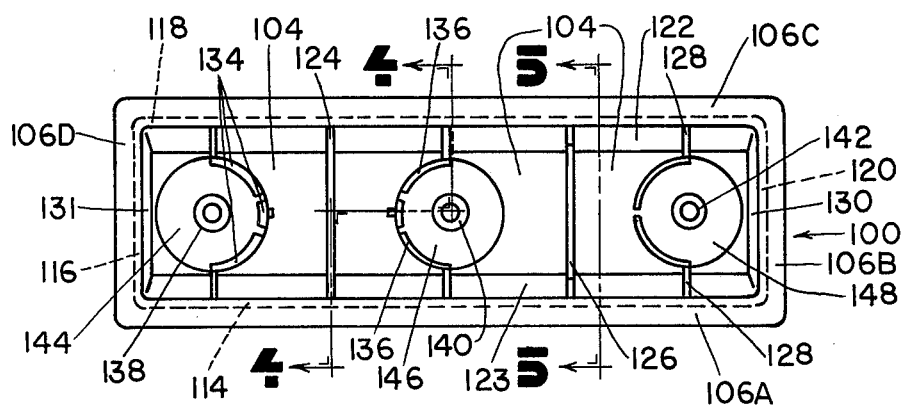
FIG. 2 is a top plan view on an enlarged scale of the base of the preferred embodiment illustrated in FIG. 1.

Referring now to FIGS. 1 and 2 which are a top plan view of the base designated generally 100 of the preferred embodiment vent cap, the base is seen to comprise a substantially planar floor 104; side walls 114, 116, 118 and 120; beveled walls 122, 123, 130 and 131; and fill hole stoppers 108, 110 and 112. Disposed around the peripheral edge of the side walls are slit reference surfaces 106a, b, c, and d, which will be discussed more fully hereinafter. Disposed within the base 100 of the preferred embodiment vent cap are a plurality of baffle means for allowing gas passing up from the battery to communicate through the venting means with the atmopshere while retaining and funneling electrolyte which inadvertently enters the battery cap back into the appropriate fill hole. As seen in FIG. 2, these baffles generally comprise transverse baffles 124 and 126 and fill hole baffles 128, 134 and 136.

Figure 4:
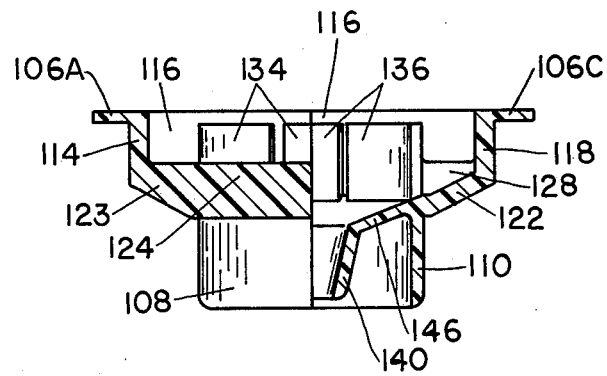
FIG. 4 is an enlarged cross section of the base of the preferred embodiment illustrated in FIG. 2 taken as indicated by the lines and arrows 4—4 in FIG. 2.
Figure 5:
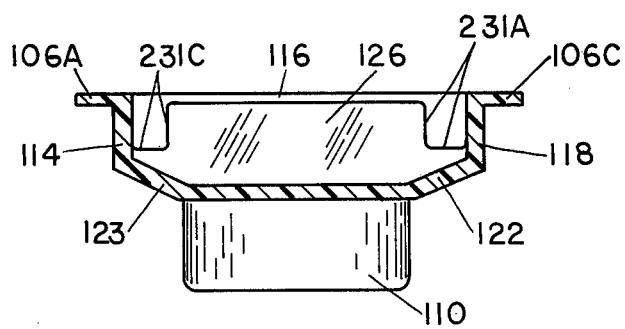
FIG. 5 is a cross section on an enlarged scale of the base of the preferred embodiment illustrated in FIG. 2 taken as indicated by the lines and arrows 5—5 in FIG. 2.
Figure 6:
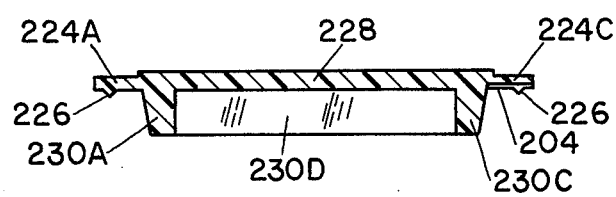
FIG. 6 is a cross section on an enlarged scale of the top portion of the preferred embodiment as illustrated in FIG. 3 taken as indicated by the lines and arrows 6—6 in FIG. 3.

Referring now generally to FIGS. 4, 5, and 6, fill hole stoppers 108 and 110 are illustrated, and this preferred embodiment vent cap is seen to comprise nipples 138, 140 and 142 which are generally centrally disposed within each fill hole stopper and which communicate with funnels 144, 146 and 148, respectively, for the purpose of funneling electrolyte back into the appropriate battery fill holes. Each nipple is seen to define a small substantially circular aperture, the size of which is selected to ensure that, relative to the venting means described hereinafter, gases will pass freely from each battery cell to be vented into the chamber of the battery cap prior to venting. Care is taken to select an aperture which will not substantially impede the flow of battery gases to be vented, even after long periods of use, while minimizing the cross sectional area which is available to electrolyte which may inadvertently splash up against the undersurfaces of the fill hole stoppers.

Figure 3:
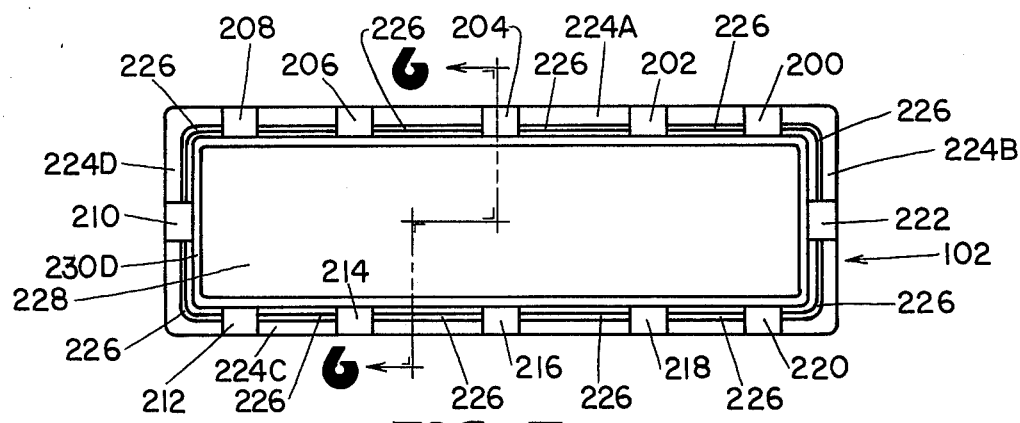
FIG. 3 is a bottom plan view on an enlarged scale of the top portion of the preferred embodiment illustrated in FIG. 1.

Referring now to FIGS. 3 and 6, the cover designated generally 102 of the preferred embodiment is illustrated. This cover comprises a plurality of slit notches 200–222 which, in the assembled condition, cooperate with the slit reference surfaces 106a, b, c and d, of the base to form venting slits, the dimensions of which will be more fully described hereinafter. It may accordingly be seen from FIGS. 3 and 6, that the cover also comprises cover slit reference surfaces 224a, b, c and d, along which an energy director 226 is formed which extends substantially continuously between slit notches 200–222 and which acts to aid in ultimately forming slits having the proper dimensions. Applicants have found that after heat sealing, this energy director will generally add a thickness of about 0.001 to 0.002 inches between the slit reference surfaces of the cover and base, as described more fully hereinafter. The top surface 228 of the cover is composed of slightly thicker material than the aforementioned cover slit reference surfaces and that the peripheral edges of the top surface 228 locating flanges 230a, b, c and d extend generally downwardly away from the top surface 228 for the purpose of engaging and aligning the cover with respect to the base upon assembly of the vent cap. Referring in particular to FIGS. 5 and 6, the locating flange portions 230a and c, shown in FIG. 6, will mate upon assembly with locating flange cutouts 231a and c of transverse baffle 126.

Figure 7:
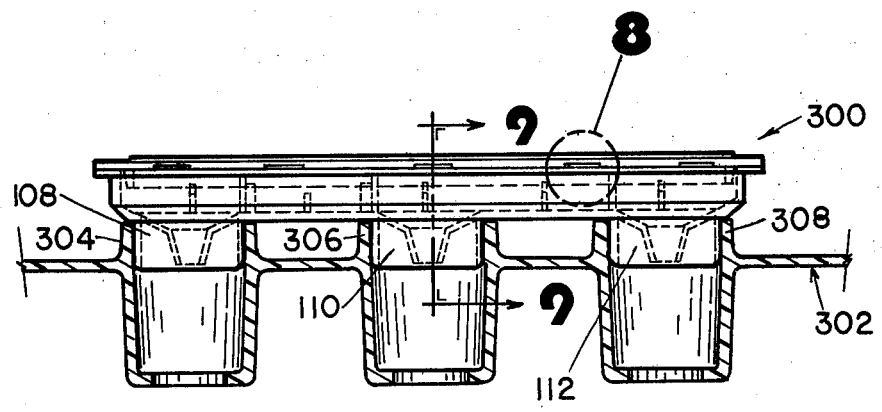
FIG. 7 is a side view of the preferred embodiment illustrated in FIG. 1 shown in engagement with the top fill holes of an electric storage battery, said storage battery being shown in cross section.
Figure 8:
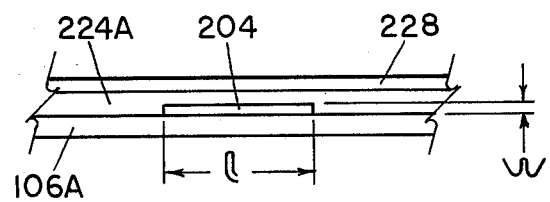
FIG. 8 is a greatly enlarged cut-away side view of a portion of the vent cap of the preferred embodiment as illustrated in FIG. 7 taken as indicated by the line broken circle and No. 8 shown in FIG. 7.
Figure 9:
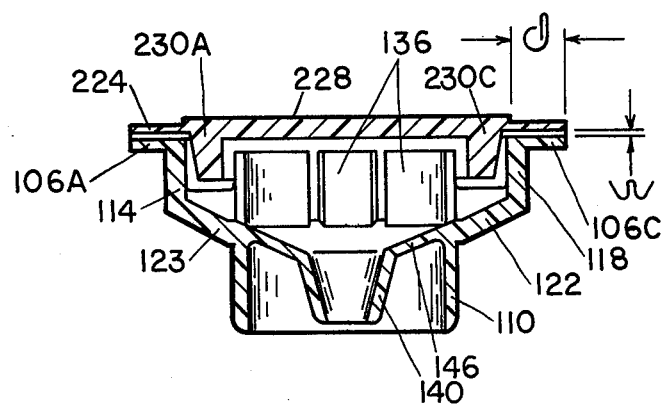
FIG. 9 is an enlarged cross section of a preferred embodiment vent cap taken on an enlarged scale, taken as illustrated by the lines and arrows 9—9 in FIG. 7.

FIGS. 7, 8 and 9 illustrate a fully assembled vent cap which is obtained by manually assembling the cover 102 on the base 100 and then heat sealing the case to the cover along bead 226 so that only the venting slits 200–222 remain open to the atmosphere when the assembled vent cap designated generally 300 is fitted into the top of a battery cover 302, and more particularly, when the fill hole stoppers 108, 110 and 111 are fitted on to that cover to sealingly engage fill holes 304, 306, and 308. It may be seen that by forming these venting slits between two pieces of the battery cover, which are subsequently assembled, narrow slits may be molded into one or the other of those pieces without the attendant flash problems which would normally accompany an injection molding of those pieces with a slit defined through one of the planar surfaces thereof. Accordingly, one of the advantages of the structure of the preferred embodiment vent cap is that only injection molding of each of the pieces is required out of a material, as for example, polypropylene (including copolymers thereof), followed by a simple manual assembly including a final heat sealing operation which leaves a plurality of open slits.

Referring in particular now to FIG. 8, slit reference surfaces 106a and 224a of the base and cover, respectively, are seen to be sealed together and to define a slit 204 therebetween having a length as indicated by the letter "$l$" in FIG. 8 and a width as indicated by the letter "$w$" in FIG. 8. Referring now in particular to FIG. 9, the slit width is again indicated by the letter "$w$" and the slit depth is indicated by the letter "$d$" in FIG. 9.

In accordance with the present invention, the width of the slits to be incorporated as a venting means in the battery vent of the present invention is critical. In order to obtain superior ignition arresting characteristics, that is, in order to prevent a spark or flame from traveling through a venting slit back into either the cavity within the battery cap or into the battery itself, it is necessary that the width of the slit not exceed at any point along its length an absolute maximum of 0.007 inches. Due in part to problems with manufacturing tolerances, and further, in order to achieve greater reliability and superior characteristics, the venting slits of the present invention should preferably have widths in the range of 0.004 to 0.005 inches plus or minus 0.001 inches. Applicant has found that a venting means having slits with this critical width will act to prevent the transmission of a spark or flame from the atmosphere in the vicinity of one side of said venting means through said venting means to the other side of said venting means. In constructing the vent in accordance with the present invention, a plurality of narrow slits are disposed through an exterior surface of the vent and are spaced apart and angled so that ignition of and/or a flame which is fed by gases emanating through any one of said slits will not tend to ignite gases which are emanating from an adjacent one of said slits. Accordingly, it may be seen that in the preferred embodiment vent cap is illustrated in the drawings, a plurality of slits are employed which are directed radially outwardly from the fill holes 304, 306 and 308 as shown in FIG. 7. In the event that a battery cap such as shown in the drawings is intended to be disposed end to end with a battery cap on adjacent fill holes, slits 210 and/or slit 222 is preferably omitted in order to minimize the likelihood that a flame generated at either of these positions would be transmitted to a similar end slit on an adjacent battery vent cap. While the preferred embodiment vent cap is illustrated as having venting slits which are all defined in a substantially horizontal plane with respect with the top of the battery cover, it may readily be appreciated that the slits may be oriented to direct gases emanating therefrom at any solid angle away from the battery cover fill hole, which is defined by any solid angle within the hemisphere defined in part by the plane intersecting each of the battery fill holes. In each case, care should be taken to prevent contagious ignition of a flame or a spark produced from gases emanating at one vent slit from igniting gases which are emanating at adjacent vent slits.

In addition to the width and orientation of the venting slits of the present invention, the number, length of the slits, and the material which defines those slits are each believed to provide important advantages to the venting means of the present invention. In particular, the length and number of slits should be selected so that the venting means of the present invention creates a minimum air resistance to gases which are vented therefrom. For electric storage batteries (automotive) of conventional capacities, applicants have found that it is necessary for the venting means of the present invention to require at least 1.5 psig of air pressure to move eight standard cubic feet per hour of air through a vent cap which is designed to vent three storage battery cells. Similarly, at least 1.5 psig of air pressure is required to move 2 ⅔ standard cubic feet per hour per cell of air through said venting means. While 1.5 psig of air pressure is believed to be a minimun, the preferred pressure range is between 1.5 to 1.75 psig. The practical upper limit of this air pressure value is not established by ignition arresting considerations, but rather is dependent upon the quality of seal between the venting means and the battery, the tendency of the vent to produce acid pumping, and/or the particular requirements of the battery for venting. That is, a relatively higher psig value may be acceptable for use with batteries, such as "maintenance free" batteries, wherein the venting requirements of those batteries is not as great as with standard "high antimony" lead acid batteries.

Accordingly, in constructing the venting means of the present invention, the total combined length of the slits to be defined in that venting means are selected to produce gas resistance characteristics as described above. The number of such slits which may be incorporated in the venting means of the present invention may vary, however it is believed that a minimum of two slits oriented in generally opposing directions is preferred so that in the event of self-sealing and self-extinguishment, a given battery vent will still retain its venting capabilities.

More particularly, it is believed that two slits per cell is the preferred minimum in order to provide substantial margin of safety in the event that the venting means is subjected to numerous exposures to ignition. It may be seen from the preferred embodiment of the present invention that, even in the event that the end slits are omitted, ten slits are provided to vent three battery cells.

Another advantage of the present invention is the provision of venting means which are self-sealing when exposed to a persistent flame. This characteristic is accomplished by constructing at least a portion of the material surrounding said slit from a meltable material such as polypropylene and copolymers thereof which is meltable and which responds to a persistent flame by melting to close or seal said slit and to thereby extinguish the flame by cutting off the fuel gas which is being supplied to said flame through said slit. It is important during this melting process to ensure that no portion of the slit increases in width beyond the size of 0.007 inches, and more preferably is maintained within the range of 0.004 to 0.005 plus or minus 0.001 inches. In the event that the melting of materail surrounding the slit should act to enlarge the slit width over the aforementioned dimensions, a spark or flame from the not yet fully extinguished flame on the exterior of the venting means would then be allowed to pass through the venting means into the interior of the vent or battery, thereby causing the possibility of an explosion. Accordingly, the depth of the slit as represented by the small letter "*d*" in FIG. 9, must comprise a depth of at least 0.040 inches over which depth the preferred width ranges are maintained. As illustrated in the preferred embodiment, the depth of each slit within which these width ranges are maintained is substantially greater than 0.040 inches, and in fact, the depth for the embodiment illustrated are approximately 3/16 of an inch, whereupon a very substantial margin of safety is provided during the melting process against ignition of gases within the vent or the battery itself.

While applicants have found that not every spark in the vicinity of the battery vent will produce a flame, and that not every flame will in fact cause an individual slit or slits to melt closed to extinguish that flame, applicants have, nevertheless, found that, particularly under high overcharge conditions (40 ampere) when a maximum volume of combustible gases is produced, the above described means for extinguishing a flame resulting from the ignition of vented gas in the vicinity of at least one of said slits operates efficiently and effectively to prevent unwanted ignition or explosion of gases within the vent or battery.

Figure 10:
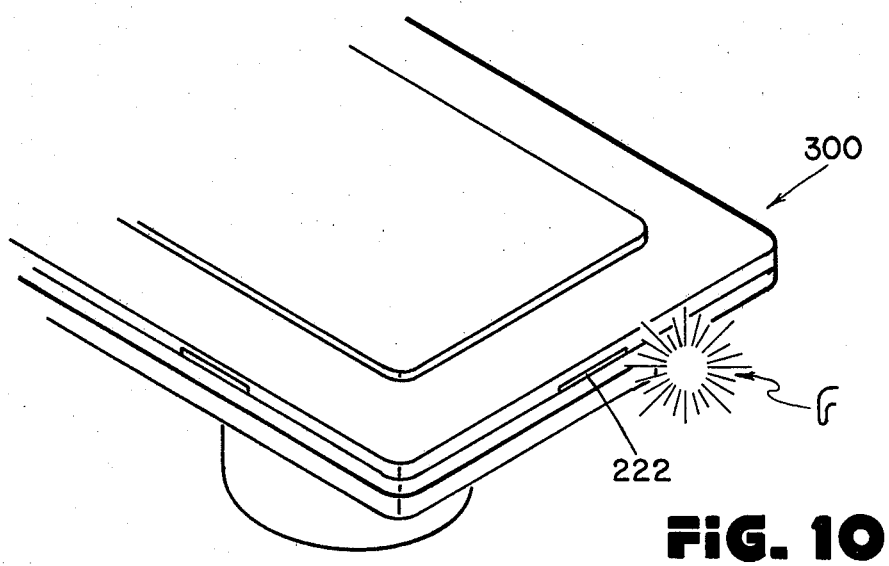
FIG. 10 is a greatly enlarged end perspective view of a cut-away portion of a vent cap similar to that illustrated in FIG. 1 of the drawings wherein the combustion of gases diffused from said vent cap within the atmosphere is illustrated diagrammatically.
Figure 11:
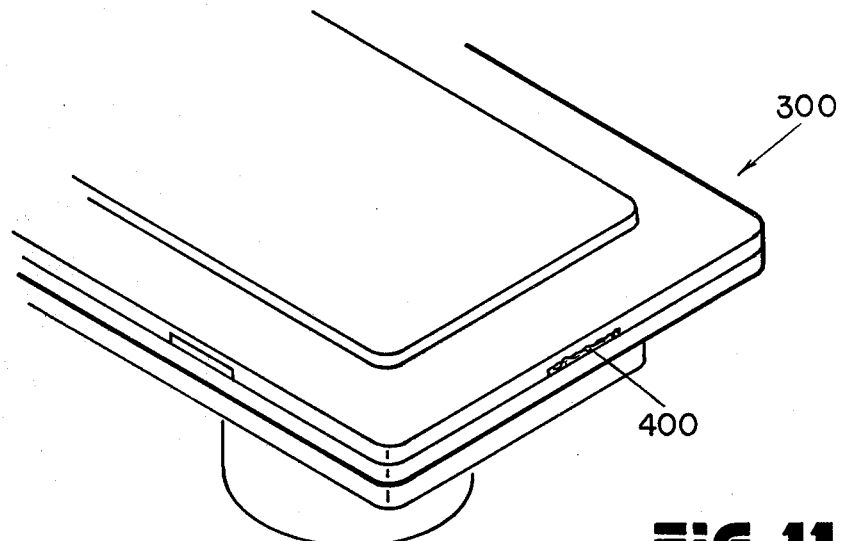
FIG. 11 is a greatly enlarged end view of a cut-away portion of a preferred embodiment vent cap as illustrated in FIG. 10 following self-extinguishment of the combustion illustrated in FIG. 10, showing a sealed slit on the end of said vent cap.

The ignition of battery gases in the vicinity of slit 222 to produce a flame designated generally F is diagrammatically illustrated in FIG. 10 and the appearance of slit 222 after melting and closure of that slit is illustrated in FIG. 11 wherein a melted portion 400 replaces slit 222 in FIG. 10 as a result of the self-sealing and self-extinguishment process described above.

From the above description it may be seen that a battery vent for use on electric storage batteries to sealingly engage one or more battery cells of said battery and to vent battery gases generated by those cells to the atmosphere is provided with a novel means for providing fluid communication between said battery and the atmosphere which means effectively arrests the ignition of flames and/or sparks causing ignition of battery gases in the atmosphere of the vicinity of the vent, while further preventing the transmission of spark or flame from the atmosphere through the novel slit means defined in at least one exterior surface of said vent. It may further be seen from the above that the transmission of ignition from the atmosphere through said slit means is prevented by constructing each slit to have a width of less than 0.007 inches and preferably between 0.004 and 0.005 inches, and by otherwise sealing the battery vent and/or openings to the battery to prevent the venting of battery gases except through said slit means.

For purposes of illustration and by way of an example, the preferred embodiment battery gang vent as illustrated in the drawings comprises between 10 and 12 slits, each of which are approximately ¼ inch long. The width of the slits illustrated are 0.004 plus or minus 0.001 inches and are spaced along the vent at varying intervals over the approximate 4.465 inches of length of said vent. For example, approximately ⅜ of an inch separates slit 204 from 202 and 206 whereas approximately ½ inch separates slits 206 and 202 from slits 208 and 200 respectively. The overall width of the battery vent cap illustrated in the drawings is approximately 1.50 inches with the end slits 222 and 210 centered thereon and having a length as aforesaid, of approximately 0.25 inches. As mentioned above, the overall depth of each slit along which the critical width of said slit is maintained in approximately 3/16 of an inch in the preferred embodiment as illustrated. For a more detailed dimensioning of the particular vent cap illustrated in the drawings, please refer to my Disclosure Document which has been accorded Disclosure Document No. 048,554, filed in the United States Patent and Trademark Office on Apr. 13, 1976, which Disclosure Document is hereby incorporated by reference as if fully set forth herein.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal, technical statement of the contents of the disclosure in compliance with the Rules of Practice of the United States Patent and Trademark Office, and is not inteded to limit the scope of the invention described and claimed herein.

What is claimed is:

1. A battery vent for use on an electric storage battery to sealingly engage one or more openings of said battery and to vent battery gases to the atmosphere, comprising:
   means for providing fluid communication between said battery and the atmosphere, said means comprising a plurality of slit means for preventing the transmission of ignition from the atmosphere through said slit means, each of said slit means being defined in at least one exterior surface of said vent, and having a width of about 0.004 to 0.005 inches.

2. The invention of claim 1 wherein said slit means further comprises means for extinguishing a flame resulting from the ignition of vented gas in the vicinity of at least one of said slits, said battery extinguishing means responsing to said ignition by causing said slit to close and comprising meltable material disposed adjacent to said slit to melt in response to said ignition to close said slit, said material defining a slit having a depth of at least 0.040 inches along which said width is maintained.

3. The invention of claim 2 wherein said depth is greater than 0.060 inches.

4. The invention of claim 1 wherein said slit means are spaced apart across at least one exterior surface of said vent to prevent the ignition of gas discharged from one of said slit means from contagiously igniting gas discharged from other of said slit means.

5. A vented, explosion proof lead acid storage battery comprising:
 (a) a case having a plurality of openings therein, at least one for each cell, said case being otherwise substantially sealed to said atmosphere; and
 (b) a battery vent for engaging each of said openings, said vent comprising means for providing fluid communication between said battery and the atmosphere, said means comprising a plurality of slit means for preventing the transmission of ignition from the atmosphere through said slit means, each of said slit means being defined in at least one exterior surface of said battery and having a width of about 0.004 to 0.005 inches, said battery vent means engaging each of said openings to otherwise seal said openings to prevent the venting of gases except through said slit means.

* * * * *